United States Patent
Schoendorfer (10) Patent No.: US 7,425,265 B2
(45) Date of Patent: Sep. 16, 2008

(54) VORTEX-ENHANCED REVERSE OSMOSIS FILTRATION DEVICE AND METHODS

(75) Inventor: Don Schoendorfer, Santa Ana, CA (US)

(73) Assignee: KKJ, Inc, Valley Center, CA (US)

( * ) Notice: Subject to any disclaimer, the term of this patent is extended or adjusted under 35 U.S.C. 154(b) by 222 days.

(21) Appl. No.: 10/516,232

(22) PCT Filed: May 30, 2003

(86) PCT No.: PCT/US03/16894

§ 371 (c)(1),
(2), (4) Date: Nov. 30, 2004

(87) PCT Pub. No.: WO2004/007048

PCT Pub. Date: Jan. 22, 2004

(65) Prior Publication Data

US 2006/0054549 A1    Mar. 16, 2006

Related U.S. Application Data

(60) Provisional application No. 60/384,559, filed on May 30, 2002.

(51) Int. Cl.
*B01D 63/16* (2006.01)
*A61M 37/00* (2006.01)

(52) U.S. Cl. ............ 210/321.63; 210/321.67; 210/321.68; 210/321.71; 604/6.09

(58) Field of Classification Search ............ 210/321.63, 210/321.67, 321.68, 321.71
See application file for complete search history.

(56) References Cited

U.S. PATENT DOCUMENTS

| 3,567,030 A | 3/1971 | Loeffler et al. |
|---|---|---|
| 3,619,243 A | 11/1971 | Galletti et al. |
| 3,879,294 A | 4/1975 | Ellis et al. |
| 3,883,434 A | 5/1975 | Gayler et al. |
| 4,230,564 A | 10/1980 | Keefer |
| 4,448,688 A | 5/1984 | Havlis |

(Continued)

FOREIGN PATENT DOCUMENTS

DE    3 817 578 A1    12/1989

(Continued)

OTHER PUBLICATIONS

*Rotating Reverse Osmosis: A Dynamic Model for Fflux and Rejection*, Lee et al., Journal of Membrane Science, Elsevier Scientific Publ. Company. Amsterdam, NL., vol. 192, No. 1-2, Oct. 15, 2001, pp. 192-143.

(Continued)

*Primary Examiner*—Krishnan S Menon
(74) *Attorney, Agent, or Firm*—Knobbe Martens Olson & Bear LLP (57) ABSTRACT

Preferred aspects of the present invention relate to advances in rotating, vortex-enhanced reverse osmosis filtration. More particularly, the filtration device and methods incorporate a rotational drive mechanism adapted to use the flow of pressurized process fluid to cause rotation of a rotor within a housing, thereby creating shear and Taylor vortices in the gap between the rotor and housing. The improvements disclosed herein facilitate continuous use of vortex-enhanced filtration for prolonged periods of time.

13 Claims, 4 Drawing Sheets

U.S. PATENT DOCUMENTS

| | | |
|---|---|---|
| 4,670,176 A | 6/1987 | Morioka et al. |
| 4,675,106 A | 6/1987 | Schoendorfer et al. |
| 4,729,837 A | 3/1988 | Henricson |
| 4,740,331 A | 4/1988 | Phillips et al. |
| 4,753,729 A | 6/1988 | Schoendorfer et al. |
| 4,790,942 A | 12/1988 | Shmidt et al. |
| 4,816,151 A | 3/1989 | Schoendorfer et al. |
| 4,871,462 A | 10/1989 | Fischel et al. |
| 4,876,013 A | 10/1989 | Shmidt et al. |
| 5,000,848 A | 3/1991 | Hodgins et al. |
| 5,034,135 A | 7/1991 | Fischel |
| 5,053,121 A | 10/1991 | Schoendorfer et al. |
| 5,073,262 A | 12/1991 | Ahlberg et al. |
| 5,194,145 A | 3/1993 | Schoendorfer |
| 5,376,263 A | 12/1994 | Fischel |
| 5,738,792 A | 4/1998 | Schoendorfer |
| 5,783,085 A | 7/1998 | Fischel |
| 5,900,142 A | 5/1999 | Maloney, Jr. et al. |
| 5,906,733 A | 5/1999 | Purvey |
| 5,925,246 A | 7/1999 | Lee et al. |
| 5,944,998 A | 8/1999 | Rolchigo et al. |
| 6,033,561 A | 3/2000 | Schoendorfer |
| 6,099,730 A | 8/2000 | Ameer et al. |
| 6,210,311 B1 | 4/2001 | May |
| 6,251,271 B1 | 6/2001 | Hagqvist |
| 6,416,665 B1 | 7/2002 | McGrathsa |
| 6,475,071 B1 | 11/2002 | Joslyn |
| 2003/0146154 A1 | 8/2003 | Moriarty et al. |
| 2003/0146157 A1 | 8/2003 | Lueptow |

FOREIGN PATENT DOCUMENTS

| | | |
|---|---|---|
| DE | 4015187 | 11/1990 |
| DE | 4102693 A1 | 8/1992 |
| DE | 4224963 A1 | 2/1994 |
| GB | 1480406 | 7/1977 |
| GB | 1 603 747 A | 11/1981 |
| GB | 2 294 887 A | 5/1996 |
| WO | WO 99/25463 | 5/1999 |
| WO | WO 03/066200 | 8/2003 |
| WO | WO 2004/007048 | 1/2004 |

OTHER PUBLICATIONS

Sangho Lee and Richard M. Lueptow, Mass Transfer and Concentration Polarization in Rotating Reverse Osmosis.

"*Experimental Verification of a Model for Rotating Reverse Osmosis*"; Sangho Lee and Richard M. Lueptow; Desalination 146 (2002) pp. 353-359.

U.S. Appl. No. 10/797,510 filed Mar. 10, 2004.

Office Actions mailed May 19, 2006 and Aug. 29, 2006.

Responses filed Aug. 21, 2006 and Nov. 29, 2006.

Notice of Allowance mailed Dec. 27, 2006.

U.S. Appl. No. 11/740,194 filed Apr. 25, 2007.

U.S. Appl. No. 10/922,763 filed Aug. 20, 2004.

Office Actions mailed Mar. 26, 2007 and May 9, 2007.

Responses filed Apr. 25, 2007 and Nov. 9, 2007.

Notices of Allowance mailed Jan. 15, 2008 and Feb. 8, 2008.

VORTEX-ENHANCED REVERSE OSMOSIS FILTRATION DEVICE AND METHODS

This application is the U.S. National Phase under 35 U.S.C. § 371 of PCT International Application No. PCT/US03/16894, filed May 30, 2003, published in English, which claims priority to U.S. Provisional Application No. 60/384,559, filed May 30, 2002.

BACKGROUND OF THE INVENTION

1. Field of the Invention

Preferred aspects of the present invention relate to rotating reverse osmosis (RO) filtration, wherein filtrate flux is enhanced by creation of shear and Taylor vortices in the coaxial gap between a RO membrane and a cylindrical wall of the filtration device.

2. Description of the Related Art

One of the most limiting problems in filtration is filter clogging, scientifically described as "concentration polarization." As a result of the selective permeability properties of the filter, the filtered material that cannot pass through the filter becomes concentrated on the surface of the filter. This phenomenon is clearly illustrated in the case of a "dead-end" filter, such as a coffee filter. During the course of the filtration process, the filtered material (coffee grounds) building up on the filter creates flow resistance to the filtrate, the fluid (coffee) which can pass through the filter. Consequently, filtrate flux is reduced and filtration performance diminishes.

Various solutions to the problem of concentration polarization have been suggested. These include: increasing the fluid velocity and/or pressure (see e.g., Merin et al., (1980) *J. Food Proc. Pres.* 4(3):183-198); creating turbulence in the feed channels (Blatt et al., *Membrane Science and Technology*, Plenum Press, New York, 1970, pp. 47-97); pulsing the feed flow over the filter (Kennedy et al., (1974) *Chem. Eng. Sci.* 29:1927-1931); designing flow paths to create tangential flow and/or Dean vortices (Chung et al., (1993) *J. Memb. Sci.* 81:151-162); and using rotating filtration to create Taylor vortices (see e.g., Lee and Lueptow (2001) *J. Memb. Sci.* 192:129-143 and U.S. Pat. Nos. 5,194,145, 4,675,106, 4,753,729, 4,816,151, 5,034,135, 4,740,331, 4,670,176, and 5,738,792, all of which are incorporated herein in their entirety by reference thereto).

Taylor vortices are induced in the gap between coaxially arranged cylindrical members when the inner member is rotated relative to the outer member. Taylor-Couette filtration devices generate strong vorticity as a result of centrifugal flow instability ("Taylor instability"), which serves to mix the filtered material concentrated along the filter back into the fluid to be processed. Typically, a cylindrical filter is rotated within a stationary outer housing. It has been observed that membrane fouling due to concentration polarization is very slow compared to dead-end or tangential filtration. Indeed, filtration performance may be improved by approximately one hundred fold.

The use of Taylor vortices in rotating filtration devices has been applied to separation of plasma from whole blood (see e.g., U.S. Pat. No. 5,034,135). For this application, the separator had to be inexpensive and disposable for one-time patient use. Further, these separators only had to operate for relatively short periods of time (e.g., about 45 minutes). Moreover, the separator was sized to accept the flow rate of blood that could reliably be collected from a donor (e.g., about 100 ml/minute). This technology provided a significant improvement to the blood processing industry. The advantages and improved filtration performance seen with rotating filtration systems (Taylor vortices) have not been widely exploited in other areas of commercial fluid separation.

In commercial blood separators, a fluid seal and mechanical bearings prevent the separated plasma from remixing with the concentrated blood cells. Pressure drives the plasma through the seal and mechanical bearings and into a tubing port that leads to a collection container. The rotor spins on an axis defined by two shaft bearings, one on either end. Spinning is induced by a rotating magnetic field and a magnetic coupling. A motor with permanent magnets fixed to its rotor generates the rotating magnetic field. While this design is appropriate for a disposable blood separator, it is not well adapted for long-term operation. First, the design adds a rotational drive motor to any filtration system, beyond the pump(s) needed for fluid feed and collection. Further, the seals are likely to wear out if the rotor is spun at 3600 rpm for prolonged periods. Likewise, the bearings that support the rotor are also likely to wear out. Use of seals and bearings adapted for continuous long-term use (like those used conventional pumps) are expensive and suffer from reliability concerns.

One other fluid separation technology, reverse osmosis (RO) membrane filtration, is well suited for removal of dissolved ions, proteins, and organic chemicals, which are difficult to remove using conventional filtration methods. Further, RO membrane systems are regenerable, thereby providing long term membrane service, requiring replacement only 1-2 times per year in commercial membrane plants. Moreover, because RO is an absolute filtration method, its treatment efficiency and performance are stable and predictable (Lee and Lueptow (2001) Reverse osmosis filtration for space mission wastewater: membrane properties and operating conditions. *J. Memb. Sci.* 182:77-90). However, membrane fouling due to concentration polarization is still a problem in conventional RO filtration.

Lee and Lueptow recently published a study that suggests that rotating filtration devices that use Taylor vortices to reduce concentration polarization may be used to enhance filtrate flux through reverse osmosis (RO) membranes (Lee and Lueptow (2001) Rotating reverse osmosis: a dynamic model for flux and rejection. *J. Memb. Sci.* 192:129-143). Unfortunately, existing Taylor-Couette systems/devices, such as those discussed above with respect to blood separation, are poorly suited for large scale commercial applications where long-term continuous operation is desirable. Consequently, a need exists for energy efficient; rotating membrane filtration systems/devices, compatible with reverse osmosis membranes, adapted to long-term continuous use and scalable for commercial separation applications.

SUMMARY OF THE INVENTION

Aspects of the present invention are directed to a device for rotational filtration. In one embodiment, the device comprises a housing having a bore with an inner wall. The housing has an inlet port for the flow of process fluid into the device and a filtrate port for the collection of filtrate. The housing may also have an outlet port for the flow of process fluid out of the device. The device also comprises a rotor having an outer wall. The rotor is adapted to rotate within the bore and has a rotational drive means adapted for driving the rotation of the rotor by the flow of process fluid. The device also comprises a filter attached to either the outer wall of the rotor or the inner wall of the bore.

In one preferred embodiment, the rotational drive means comprises a plurality of turbine vanes on the rotor. The turbine vanes are positioned at least partially within the flow path of the process fluid, to drive the rotation of the rotor. In one specific embodiment, the turbine vanes are positioned at the inlet port and the flow of process fluid into the device drives the rotation of the rotor.

According to another aspect of the present invention, the rotational filtration device also comprises a gap between the rotor and the housing, wherein the gap is configured so as to facilitate formation of Taylor vortices within the gap when the rotor is rotating within the bore. In one preferred embodiment the gap is sized so that the ratio of the gap to radius is less than about 0.142. In other embodiments the gap is sized so that the ratio of the gap to radius is greater than about 0.142.

A filter is disposed within the gap. The filter is preferably provided in the form of a membrane for some embodiments. In one preferred embodiment, the membrane is attached to the inner wall of the bore. In another specific embodiment, the housing further comprises a layer of porous material located between the membrane and the inner wall.

According to yet another aspect of the present invention, the rotor further comprises surface modifications adapted to create wake turbulence. These surface modifications may include longitudinal grooves.

Preferably, the filter comprises a filtration membrane which is selected from the group including micro, macro, nano, dialysis and reverse osmosis membranes.

A method is disclosed in accordance with another embodiment of the present invention for filtering a solution and/or suspension to separate soluble and/or insoluble materials from a liquid filtrate. The method comprises the steps of: (1) providing a device comprising a cylindrical housing having at least one inlet port and at least one filtrate port, a cylindrical rotor adapted to rotate within the housing, the rotor having a rotational drive means comprising a plurality of turbine vanes, and a filtration membrane affixed to the rotor or the housing, between the at least one inlet port and the at least one filtrate port; (2) introducing the solution and/or suspension under pressure into the at least one inlet port, such that the solution and/or suspension flows across the turbine vanes causing the rotor to rotate within the housing; (3) allowing the rotor to rotate at a rate sufficient to generate Taylor vortices in a gap between the rotor and the housing, thereby reducing concentration polarization along the filtration membrane; and (4) collecting the filtrate from the at least one filtrate port after passing through the filtration membrane.

In accordance with another preferred embodiment, a filtration device is disclosed. The device comprises: a housing having a bore; an inlet port on the housing; a filtrate port on the housing; a rotor adapted to rotate within the bore, the rotor comprising a turbine vane configured to convert a flow of pressurized process fluid from the inlet port into rotational energy; a gap between an inner surface of the bore and the rotor; and a filter within the gap, between the inlet port and the filtrate port.

DETAILED DESCRIPTION OF THE PREFERRED EMBODIMENTS

Figure 1:
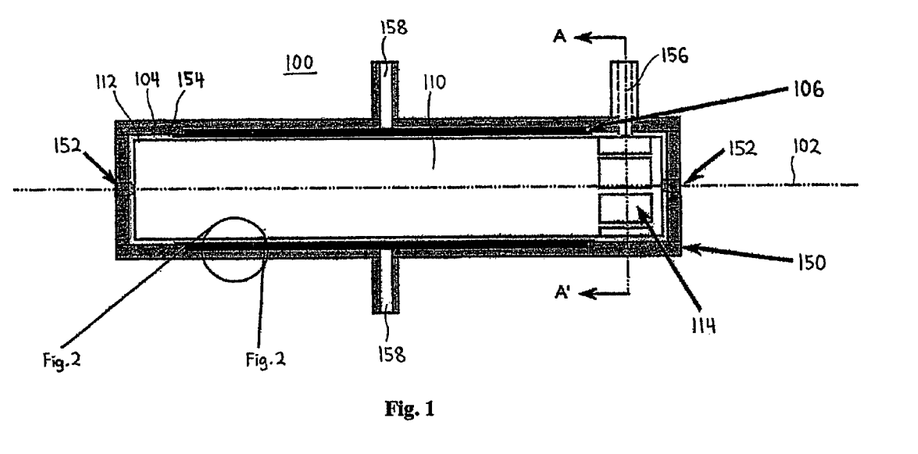
FIG. 1 is a sectional view of the rotational filtration device according to one embodiment of the present invention.

FIG. 1 is a sectional view of the rotational filtration device 100 according to one embodiment of the present invention. The sectional view shows the housing 150 of the rotational filtration device bisected along line A-A', but the rotor 110 is shown intact. The rotational filtration device 100 comprises a rotor 110 arranged coaxially within the bore of a housing 150. In the illustrated embodiment both the rotor 110 and the bore are cylindrical. In one embodiment the rotor 110 is mounted on two posts 152 within the housing 150 along the central axis 102 of the rotational filtration device 100. These posts limit both the axial and the radial motion of the rotor 110. There is a gap 104 between the outer wall 112 of the rotor 110 and the inner wall 154 of the housing 150. The gap 104 extends evenly around the rotor 110. In another embodiment the posts 152 are not used and the rotor 110 is suspended within the housing 150 solely by the flow of process fluid through the gap 104.

The housing 150 comprises an inlet port 156 and one or more filtrate ports 158. The process fluid flows into the rotational filtration device 100 via the inlet port 156. The filtrate (filtered process fluid) flows out of the rotational filtration device 100 via the filtrate ports 158. Additionally, the housing 150 may comprise an outlet port (not shown), through which the process fluid flows out of the rotational filtration device 100. The outlet port allows the flow of process fluid through the rotational filtration device 100 at a greater rate than the flow of filtrate out of the rotational filtration device 100. The number of each port may be adjusted to modify the flow of the process fluid.

The rotor 110 comprises a rotational drive means 114 which is positioned at least partially within the flow path of the process fluid to drive the rotation of the rotor 110. In the illustrated embodiment, the rotational drive means 114 comprises a plurality of turbine vanes. These turbine vanes are positioned at the inlet port 156 and the flow of process fluid into the rotational filtration device 100 via the inlet port 156 drives the rotation of the rotor 110.

A filter 106 is disposed within the gap 104. In the illustrated embodiment, the filter 106 is mounted on the inner wall 154 of the housing 150. In another embodiment, the filter 104 may be mounted on the outer wall 112 of the rotor 110. For this embodiment, the inlet port 156 is relocated to direct the flow of the process fluid into the interior of the rotor 110 to accommodate the mounting of the filter 106 on the outer wall 112 of the rotor 110.

According to some embodiments, the filter comprises of a filtration membrane which is selected from the group including micro, macro, nano, dialysis and reverse osmosis membranes.

Figure 2:
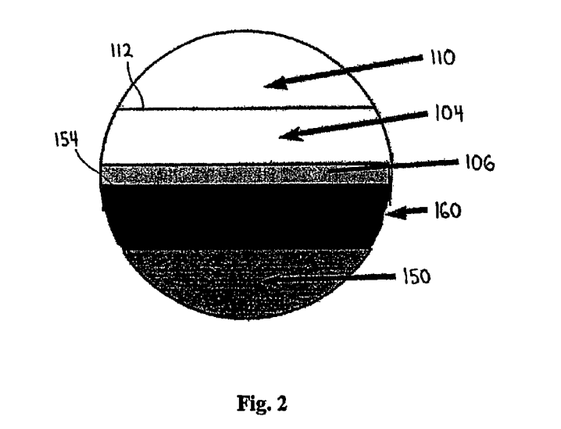
FIG. 2 is an enlarged view of the circled area in FIG. 1 to show the gap between the outer wall of the rotor and the inner wall of the housing.

FIG. 2 is an enlarged view of the circled area in FIG. 1 to clarify the gap 104 between the outer wall 112 of the rotor 110 and the inner wall 154 of the housing 150. As discussed above with reference to FIG. 1, the filter 106 is mounted on the inner wall 154 of the housing 150. Referring to FIG. 2, the filter 106 may be supported by a sintered porous bed 160 or any other porous structure known in the art. In one embodiment the porous bed may be made of stainless steel. The porous bed 160 provides a foundation for the filter 106 to withstand the high pressure within the housing 150 (e.g. 1000 psi), while its porosity adds little resistance to the flow of the filtrate out of the filtrate port 158.

The gap 104 is sized to provide optimal shear and vorticity to the process fluid as it flows through the gap 104. In one embodiment, the rotor is 1" in diameter, 5" long, and the gap 104 is 0.020". The rotor 110 spins at a rate of 3600 rpm in this embodiment. Rotor and housing configurations and gap dimension can be modified as described in Lee and Leuptow (2001) in order to optimize filtrate flux.

The dimensions of the various components of the rotational filtration device 100 described above can be scaled up and down depending on the application. For example, the rotational filtration device disclosed in Lee and Lueptow (2001) employs a relatively large gap (0.142") on a rotor 110 radius of 1", or a gap to rotor radius ratio of 0.142. Some embodiments may employ a much smaller gap to increase shear. Other embodiments may employ a larger gap to increase Taylor vorticity. Increasing the gap increases Taylor vorticity but reduces shear. Those of skill in the art can readily determine the optimal balance between Taylor vorticity and shear depending on the application. For example, excessive shear is preferably avoided in blood separators to minimize damage red blood cells or other desired blood components. However, for water treatment (e.g., desalination), shear damage is of less or no concern.

It is known from tangential filtration that the higher the shear the better the membrane filter performs, because shear reduces membrane clogging by diminishing concentration polarization. In tangential filtration, however, there is a limit to the effectiveness of shear in improving filtrate flux because the tangential flow is generated by pumping pressure, which can be limiting. The Taylor-Couette devices as modified in the present invention allow increased shear without increased pressure, because the shear is created by the rotation of the rotor 110 within the housing 150 and varies as discussed above with the size of the gap 104. In one preferred embodiment, the gap to radius ratio is about 0.040, or about ⅓ that taught by the Lueptow reference (about 0.142) cited above.

Figure 3:
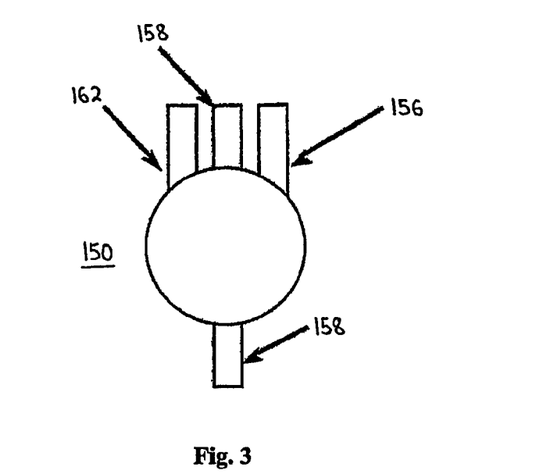
FIG. 3 illustrates the end of the housing viewed along the central axis of the rotational filtration device.

FIG. 3 illustrates the end of the housing 150 viewed along the central axis 102 of the rotational filtration device 100. As discussed above with reference to FIG. 1, the housing 150 comprises an inlet port 156 and one or more filtrate ports 158. Referring to FIG. 3, an outlet port 162 is also shown.

Figure 4:
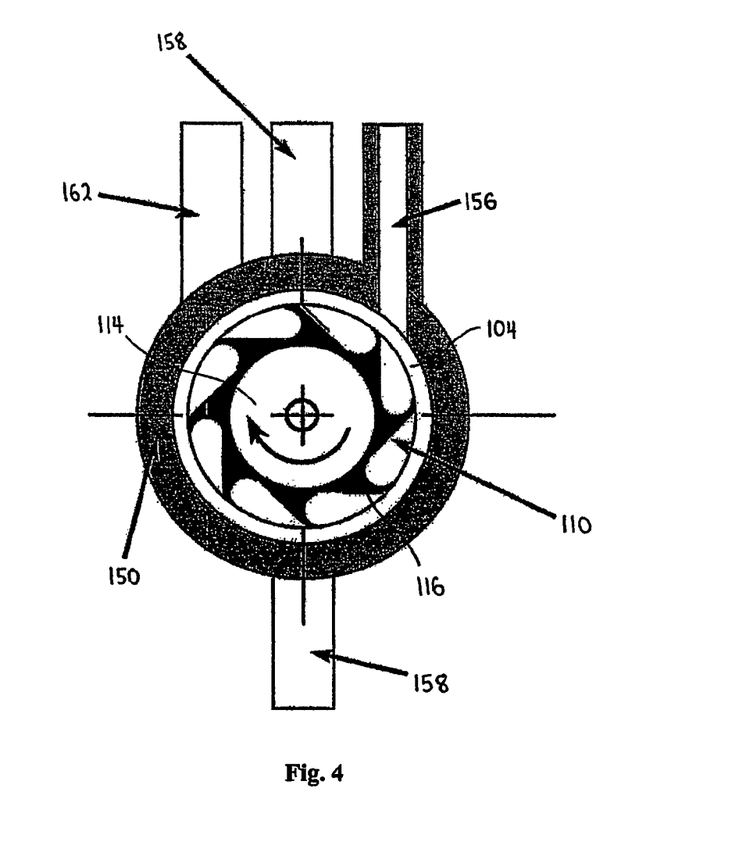
FIG. 4 is a cross sectional view of the rotational filtration device at line A-A' of FIG. 1.

FIG. 4 is a cross sectional view of the rotational filtration device 100 at line A-A' of FIG. 1. As discussed above with reference to FIG. 1, the rotor 110 comprises a rotational drive means 114 which is positioned at least partially within the flow path of the process fluid to drive the rotation of the rotor 110. Referring to FIG. 4, the rotational drive means 114 comprises a plurality of turbine vanes 116. These turbine vanes 116 are positioned at the inlet port 156 and sculpted to capture the flow of process fluid into the rotational filtration device 100 via the inlet port 156, which drives the rotation of the rotor 110. Preferably, the process fluid is pumped at a relatively high flow rate and pressure (e.g., about 100-1000 mL/min for the dimensions discussed above with reference to FIG. 2).

Figure 5A:
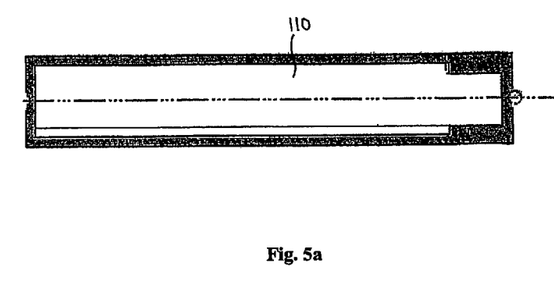
FIG. 5a is a sectional view of the rotor taken along line B-B' of FIG. 5b.
Figure 5B:
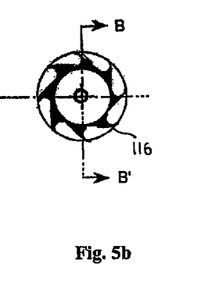
FIG. 5b is cross sectional view of the rotor showing the turbine vanes.
Figure 6A:
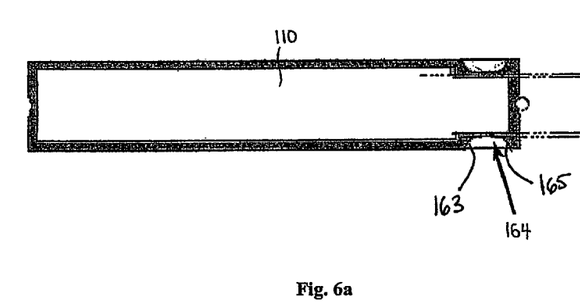
FIG. 6a is a sectional view of the rotor taken along line C-C' of FIG. 6b.

FIG. 5a is a sectional view of the rotor 110 taken along line B-B' of FIG. 5b, which is cross sectional view of the rotor 110 similar to that in FIG. 4. FIG. 6a is a sectional view of the rotor 110 taken along line C-C' of FIG. 6b, which is a cross sectional view of the rotor 110 similar to that in FIG. 5b, except the rotor 110 is rotated clockwise about one sixth of a rotation. FIG. 6a illustrates the semicircular shape 164 of the vanes.

In accordance with one preferred embodiment, the rotor is preferably freely supported. There may be center limit posts extending from the housing on the axis of rotation. These limit posts restrict both axial and radial motion of the rotor until it reaches its optimal self-centering speed.

A rotor surrounded by a viscous fluid and constrained to rotate within a bearing surface will self-center itself. Fluid tends to follow the rotor, and thus the rotor is in a sense totally submerged as it spins. Pressure increases where the gap is small, and the pressure tends to push the rotor away from the case and increase the gap.

There are preferred ranges of rotational speed (RPM) where the self-centering effect becomes optimal. That RPM range depends on viscosity and density of the fluid, gap, rotor geometry, and possibly other variables. The center limit posts help keep the rotor reasonably centered during spin-up of the system.

Figure 6B:
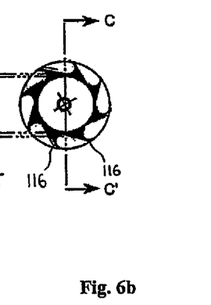
FIG. 6b is a cross sectional view of the rotor and turbine vanes.

In one preferred embodiment, as shown in FIGS. 5-6, the rotor includes a section of turbine vanes, centrally located under the tangential inlet port. Preferably, process fluid (salt water for example) is pumped at a relatively high flow rate for the system dimensions described above (e.g., about 100-1000 mL/min) and at high pressures. FIGS. 4-6 show some detail on the vanes. The inlet port is preferably positioned so that inlet flow hits the rotor tangentially in the form of a jet. The vanes are preferably sculptured to capture this inlet flow and convert it into rotational energy.

The self-centering forces described above with respect to a rotor surrounded by a viscous fluid operate to cause radial centering. Design features of the turbine vanes that function to keep the rotor axially centered are illustrated in FIGS. 6a and 6b (see e.g., the cut-out 164 in FIG. 6a, corresponding to the section C-C' in FIG. 6b). The curvature of the vanes can be shaped to divert the forces of the inlet flow to move the rotor to a stable equilibrium position directly under the inlet port. Inlet flow against the semicircular shape of the vane will tend to split, with some going left and some going right. When the device is horizontal, as shown in FIG. 6a and 6b, if the rotor moves to the right under the inlet port, the left wall of the vane 163 will accept more force than the right wall 165, and this will tend to move the rotor back to center it under the inlet port. This is an axial self-centering design feature. The vanes can be modified, as known to those of skill in the art, to stabilize the rotor so it levitates, in a sense, and does not contact either center limit post. For example, if axial flow of the feed fluid tends to push the rotor towards the outlet port, the curvature of the vane can be modified, making the curvature on the left side steeper than on the right. This will add a force to oppose that pushing the rotor to the outlet port.

In some embodiments the rotor 110 is solid. In other embodiments the rotor 110 is hollow. In some of these other embodiments the hollow rotor 110 is permeable to the process fluid to reduce the buoyancy of the rotor 110 within the housing 150.

Referring to FIGS. 1 and 2, the surfaces of the outer wall 112 of the rotor 110 and the inner wall 154 of the housing 150 may be modified to increase turbulence and enhance the formation of Taylor vortices. For example, texture may be added to either or both surfaces. More particularly, longitudinal grooves on the outer wall 112 of the rotor 110 will cast trailing wakes that will increase Taylor vorticity and should improve filtrate flux. Further, the addition of surface modifications such as longitudinal grooves may be used to create an exit path for the inlet flow, which is diverted to the right by the turbine vanes as illustrated in FIG. 4. The exit path could be along deep longitudinal groves that direct flow from the right side of the housing 150 back into the gap 104 and then out through an outlet port 162.

Referring to FIG. 4, the rotation of the rotor 110 coaxially within the housing 150 generates a self-centering effect. The rotor 110 behaves like a spinning shaft within a journal bearing, with the process fluid serving as a lubricant. The process fluid forms a sheet within the gap 104 between the rotor 110 and the housing 150. The rotation of the rotor 110 induces motion in the process fluid which produces a hydrodynamic pressure in the sheet. The hydrodynamic pressure is a function of the width of the gap 104, the diameter of the rotor 110, its rate of rotation, the density and viscosity of the process fluid. Above a threshold rate of rotation, this hydrodynamic pressure tends to keep the width of the gap 104 even, causing the rotor 110 to self-center within the housing 150. Referring to FIG. 1, the posts 152 keeps the rotor 110 reasonably centered along the central axis 102 before it reaches the discussed threshold rate of rotation. A more detailed discussion of the radial self-centering effect is given in the *Standard Handbook for Mechanical Engineers,* 7th Edition (1967), Baumeister and Marks, pages 156-157.

As discussed immediately above and earlier with reference to FIG. 2, the width of the gap 104 affects shear, Taylor vorticity, and the hydrodynamic pressure which generates self-centering effect of the rotor 110. The optimization of any one of these factors may reduce the effect of the other two. One possible solution is discussed with reference to FIG. 7.

Figure 7:
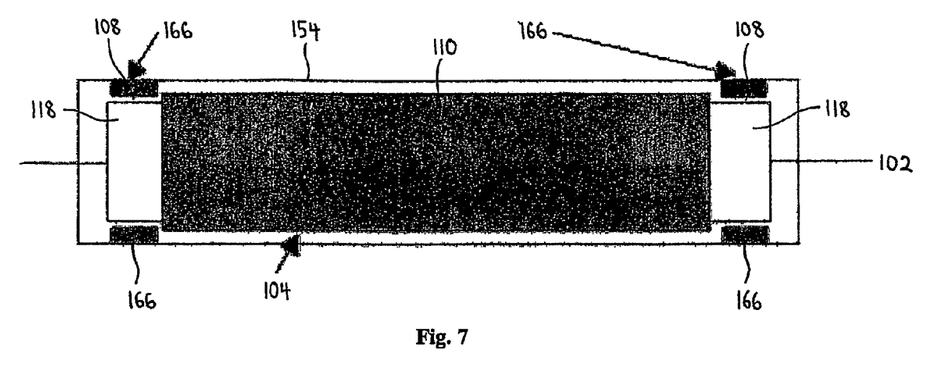
FIG. 7 illustrates a rotational filtration device according to another embodiment of the present invention, having one or more inner cylindrical sections added to the rotor.

FIG. 7 illustrates a rotational filtration device built according to another embodiment of the present invention. One or more inner cylindrical sections 118 are added to the rotor 110 in the illustrated embodiment. In other embodiments these inner cylindrical sections 118 may be arranged within the length of the rotor 110. These inner cylindrical sections 118 cooperate with outer cylindrical sections 166 added to inner wall 154 of the housing 150, forming a gap 108 between them. The gaps 104 and 108 have different widths, allowing the gap 104 to be optimized for filtration (e.g., shear and Taylor vorticity) and the gap 108 to be optimized for self-centering the rotor 110 (e.g., hydrodynamic pressure).

While the inner cylindrical sections 118 have a smaller diameter than the rotor 110, and the outer cylindrical sections 166 are implemented as protrusions in the illustrated embodiment, another embodiment may implement the inner cylindrical sections 118 with a greater diameter than the rotor 110, and the outer cylindrical sections 166 as cooperating depressions. Further, the length of the rotor 110 and the cooperating inner cylindrical sections 118 and outer cylindrical sections 166 may be adjusted to modify the optimization effects.

Figure 8:
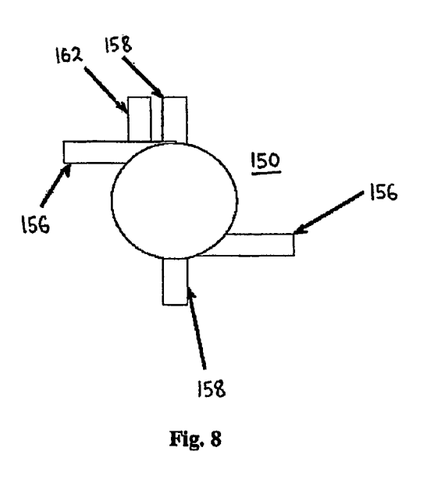
FIG. 8 illustrates an end view of a rotational filtration device having two inlet ports.

Forces which tend to cause the rotor 110 to move off-center from the central axis 102 (see e.g., FIG. 1) include the flow of the process fluid into and out of the housing 150 via the inlet port 156 as well as the flow of filtrate out of the housing 150 via the filtrate ports 158, and in some embodiments, via an outlet port 162, shown in FIG. 8. The outlet port may be used in some embodiments to re-circulate unfiltered process fluid that was used to drive the turbine, but could not be filtered without unduly increasing the filtration pressure. In one embodiment, the outlet port may include a valve, adapted to maintain a constant filtration pressure within the device, while providing sufficient fluid flow to drive the rotor at a desired RPM. To minimize the off-centering forces, the number of these ports (inlet, filtrate and outlet) may be adjusted.

FIG. 8 illustrates a rotational filtration device similar to that discussed above with reference to FIGS. 1-6, but with two inlet ports 156. Generally, a rotational filtration device having a plurality of ports serving the same function (e.g., a plurality of inlet ports) will have those ports arranged evenly around the circumference of the housing 150. In the illustrated embodiment, the two inlet ports 156 are opposed such that their respective effect on the rotor 110 (not shown) is offset or balanced. In some embodiments, the respective flow of the process fluid into the housing 150 via each inlet port 156 may be individually adjusted to further tune the use of the two opposed inlet ports 156. In other embodiments, the number of outlet ports and filtrate ports may also be adjusted. The miniminzation of off-centering forces may reduce the necessary gap hydrodynamic pressure for the rotor 110 to self-center.

Table 1 summarizes the experimental results obtained using a motor-driven RO prototype system. The prototype rotational filtration device used a Hydranautics ESNA membrane (Oceanside, Calif.). Hydranautics calls this a nanofilter. The rotor was 1" in diameter, 5" long, and the gap was 0.020". Each housing half contained a 1.4" by 3.5" sheet of membrane (4.9 in$^2$ or 32 cm$^2$) covering a filtrate port. The reduction in active membrane area from its mounting on a porous bead diminished the active surface area by about 50%.

The rotor used in developing the data presented in Table 1 did not include the turbine drive vanes described above with reference to FIGS. 1-6. Instead, it was rotated via magnetic drive. Rotor speeds varied from 3000 to 4600 RPM. The test solution was NaCl (ordinary table salt) in tap water. Transmembrane pressure ran between 50 and 160 psi.

TABLE 1

| Date of Experiment | Salt content Input (ppm) | RPM | Pump used | Input flow (ml/min) | Pressure (psi) | Top half filter Drip rate | Top half filter Salt content | Top half filter % rejection | Bottom half filter Drip rate | Bottom half filter Salt content | Bottom half filter % rejection | Comments |
|---|---|---|---|---|---|---|---|---|---|---|---|---|
| Apr. 4, 2002 | 0 | 3000 | Test 1 P777 | 30 | 100 | 10 | 0 | N/A | 13 | 0 | N/A | running fresh water |
|  |  |  |  |  | 90 | 10 | 0 | N/A | 14 | 0 | N/A |  |
|  |  |  |  |  | 60 | 12 | 0 | N/A | 17 | 0 | N/A |  |
|  |  |  |  |  | 70 | 17 | 0 | N/A | 22 | 0 | N/A |  |
|  |  |  |  |  | 60 | 18 | 0 | N/A | 24 | 0 | N/A |  |
|  |  |  |  |  | 60 | 21 | 0 | N/A | 29 | 0 | N/A |  |
| Apr. 4, 2002 | 0 | 4000 | " |  | 90 | 10 | 0 | N/A | 14 | 0 | N/A | running fresh water |
|  |  |  |  |  | 70 | 13.5 | 0 | N/A | 18.5 | 0 | N/A |  |
|  |  |  |  |  | 60 | 21 | 0 | N/A | 29 | 0 | N/A |  |
| Apr. 5, 2002 | 500 | 3000 | " | 30 | 90 | 8 | 200 | 60 | 13 | 0 | 100 | New rotor and magnetic drive |
| Apr. 8, 2002 | 0 | 3000 | " |  | 90 | 6 | 0 | N/A | 12 | 0 | N/A | running fresh water |
|  |  |  |  |  | 80 | 7 | 0 | N/A | 13.5 | 0 | N/A |  |
|  |  |  |  |  | 70 | 8 | 0 | N/A | 16 | 0 | N/A |  |
|  |  |  |  |  | 50 | 10 | 0 | N/A | 18.5 | 0 | N/A |  |
|  |  |  |  |  | 50 | 12 | 0 | N/A | 21.5 | 0 | N/A |  |
| Apr. 8, 2002 | 750 | 3000 | " |  | 90 | 7 | 200 | 73 | 11.5 | 0 | 100 |  |
|  |  |  |  |  | 90 | 8 | 300 | 60 | 11.5 | 100 | 87 |  |
|  |  |  |  |  | 90 | 10 | 700 | 44 | 15.5 | 500 | 60 |  |
| Apr. 8, 2002 | 1250 | 3000 | " |  | 95 | 7 | 700 | 44 | 16 | 500 | 60 |  |
|  |  |  |  |  | 90 | 8 | 600 | 44 | 16 | 400 | 66 |  |
|  |  |  |  |  | 60 | 9 |  |  |  |  |  |  |

TABLE 1-continued

| Date | | | | | | | | Notes |
|---|---|---|---|---|---|---|---|---|
| Apr. 10, 2002 | 2500 | 3000 | " | 5 (?) | 95<br>95 | 11<br>12 | | |
| Apr. 12, 2002 | 5000 | 3000 | " | 5 (?) | 95<br>95<br>95 | 10<br>10.5<br>15 | 1300 | 21<br>22<br>20.5 1000 |
| Apr. 12, 2002 | 100000 | 3000 | " | | 95<br>80 | 14<br>14<br>15 | 5000<br>5000<br>10000 | 21.5<br>29<br>24.5 2500<br>24 4000<br>29 3500<br>By this time Top leaks significantly<br>Top leaks and salt content = Input |
| Apr. 20, 2002 | 0 | Haldex 4F 649A | | 100 | 95<br>120 | 14<br>10 | 0<br>0 | 21.5<br>17 0<br>60 0<br>Switched to new pump & running fresh water |
| Apr. 20, 2002 | 100000 | 3000 | " | 100 | 100<br>120<br>140<br>160 | 25<br>12<br>10 | 10000 | 26<br>23 4500<br>Top leaks and salt content = Input |
| Apr. 21, 2002 | 100000 | 4000 | " | 100 | 120<br>140<br>150<br>160 | 9<br>7<br>6<br>6 | | 23<br>18<br>16.5<br>15 |
| Apr. 21 2002 | 100000 | 0 | " | 100 | 160 | 6 | | 16 Filtrate flow rate same with rotor stationary |

Table 1 shows that up to 100% of the salt contaminatin the feed solution was rejected. These results clearly suggest that placing the membrane on the housing is acceptable, and that salt can be removed from water at relatively low pressures and rpm.

In variations to the embodiment illustrated in FIGS. 1-8, this invention can be applied to a vast number of applications. In a general sense, embodiments of this invention can be useful in any application where filters loose performance due to clogging or concentration polarization. These applications include: removal of salt from water, processing sea water for human consumption, processing sea water for agricultural uses, reprocessing waste water for agricultural uses, reprocessing waste water for human consumption, concentrating sugar or other desired components from sap from plants, such as sugar cane sap or maple sap, concentrating latex from the sap of rubber plants, removing impurities from water for industrial applications, such as needed in the pharmaceutical or electronic industries, recycling cooking oil, recycling motor oil or lubricating oils, and producing sterile water for intravenous injection.

Further, where molecular exclusion or sieving membranes are employed, the device can be used for large scale cell and biotechnology separation applications, such as purifying cell supernatants and/or lysates from cellular material in a bioprocessor or fermentor. The advantages discussed above with regard to energy efficiency (flow-driven turbine) and high flux rates (vortex-scrubbed membranes) would be applicable to the large scale filtration needs of the biotechnology industry. Similarly, some embodiments of the present turbine-driven device may be well suited for energy-efficient filtration of fermented beverages, to remove for example, yeast and particulate material (grains, vegetable matter, fruit, etc.) in the production of wines and beers.

The various materials, methods and techniques described above provide a number of ways to carry out the invention. Of course, it is to be understood that not necessarily all objectives or advantages described may be achieved in accordance with any particular embodiment described herein. Thus, for example, those skilled in the art will recognize that the components of the system may be made and the methods may be performed in a manner that achieves or optimizes one advantage or group of advantages as taught herein without necessarily achieving other objectives or advantages as may be taught or suggested herein.

Although the present invention has been described in terms of certain preferred embodiments, other embodiments of the invention including variations in dimensions, configuration and materials will be apparent to those of skill in the art in view of the disclosure herein. In addition, all features discussed in connection with any one embodiment herein can be readily adapted for use in other embodiments herein. The use of different terms or reference numerals for similar features in different embodiments does not imply differences other than those which may be expressly set forth. Accordingly, the present invention is intended to be described solely by reference to the appended claims, and not limited to the preferred embodiments disclosed herein.

What is claimed is:

1. A device for rotational filtration, comprising:
    a stationary housing having a bore with an inner wall, said housing also having an inlet port for directing a flow of pressurized process fluid into the device and a filtrate port for collecting a filtrate;
    a freely-supported, self-centering rotor having an outer wall, a rotational drive means for converting the flow of pressurized process fluid into rotational energy, whereby said rotor rotates within said bore and wherein said rotational drive means comprises a plurality of turbine vanes on said rotor, said turbine vanes being positioned at least partially within a flow path of the pressurized process fluid; and
    a filtration membrane attached to said inner wall of said bore.

2. The device of claim 1, further comprising a gap between said rotor and said housing, wherein said gap is configured to facilitate formation of Taylor vortices within the gap when said rotor is turning within said bore.

3. The device of claim 2, wherein said gap is sized so that the ratio of gap to radius is less than about 0.142.

4. The device of claim 3, further comprising a layer of porous material located between said filtration membrane and said inner wall.

5. The device of claim 1, wherein said rotor further comprises surface modifications adapted to create wake turbulence.

6. The device of claim 5, wherein said surface modifications are longitudinal grooves.

7. The device of claim 1, wherein said filtration membrane is selected from the group consisting of micro, macro, nano, dialysis and reverse osmosis membranes.

8. The device of claim 1, further comprising at least two inlet ports arranged at substantially equal circumferential distances from one another, wherein the flow of pressurized process fluid against the turbine vanes on said rotor facilitates self-centering at a lower RPM.

9. The device of claim 1, wherein said turbine vanes are shaped so as to allow said rotor to axially self-center within the flow path.

10. A method for filtering a solution and/or suspension to separate soluble and/or insoluble materials from a liquid filtrate, comprising the steps of:
    providing a device comprising a stationary housing having at least one inlet port and at least one filtrate port, a freely-supported, self-centering rotor comprising a plurality of turbine vanes, and a filtration membrane affixed to the housing, between said at least one inlet port and said at least one filtrate port;
    introducing the solution and/or suspension under pressure into said at least one inlet port, such that the solution and/or suspension flows across the turbine vanes causing the rotor to rotate within the housing;
    allowing the rotor to rotate at a rate sufficient to self-center and to generate Taylor vortices in a gap between the rotor and the housing, thereby reducing concentration polarization along the filtration membrane; and
    collecting the filtrate from the at least one filtrate port.

11. The filtration device of claim 1, further comprising an outlet port.

12. The filtration device of claim 11, wherein said outlet port comprises a valve adapted to maintain a constant filtration pressure.

13. The filtration device of claim 2, wherein a diameter of said rotor varies along a length of said rotor such that said gap varies in width.

* * * * *

UNITED STATES PATENT AND TRADEMARK OFFICE
CERTIFICATE OF CORRECTION

| | |
|---|---|
| PATENT NO. | : 7,425,265 B2 |
| APPLICATION NO. | : 10/516232 |
| DATED | : September 16, 2008 |
| INVENTOR(S) | : Donald W. Schoendorfer |

It is certified that error appears in the above-identified patent and that said Letters Patent is hereby corrected as shown below:

Title Page; On Page 1, Item (75), "Inventor," Line 1, change -- Don -- to -- Donald W. --.

In Column 8, Lines 31-32, change -- miniminzation -- to -- minimization --.

In Column 9, under the heading "Pressure (psi)," Line 3 (approx.) under the heading rows of Table 1, change -- 60 -- to -- 80 --.

In Column 9, under the heading "Pressure (psi)," Line 6 (approx.) under the heading rows of Table 1, change -- 60 -- to -- 50 --.

In Column 9, under the heading "Pressure (psi)," Line 10 (approx.) under the heading rows of Table 1, change -- 60 -- to -- 50 --.

In Column 9, under the heading "Pressure (psi)," Line 19 (approx.) under the heading rows of Table 1, change -- 50 -- to -- 60 --.

In Column 9, under the heading "% rejection," Line 22 (approx.) under the heading rows of Table 1, change -- 70 -- to -- 73 --.

In Column 9, under the heading "Pressure (psi)," Line 28 (approx.) under the heading rows of Table 1, change -- 60 -- to -- 80 --.

In Column 11, under the heading "Sak content Input ppm," Line 38 (approx.) under the heading rows of Table 1, change -- 100000 -- to -- 10000 --.

In Column 11, under the heading "% rejection," Line 22 (approx.) under the heading rows of Table 1, change -- 60 -- to -- 50 --.

In Column 11, under the heading "Sak content Input ppm," Line 44 (approx.) under the heading rows of Table 1, change -- 100000 -- to -- 10000 --.

In Column 11 (Table 1), under the heading "Drip rate," Line 46 (approx.) under the heading rows of Table 1, change -- 26 -- to -- 28 --.

In Column 11 (Table 1), under the heading "% rejection," Line 47 (approx.) under the heading rows of Table 1, change -- 60 -- to -- 0 --.

UNITED STATES PATENT AND TRADEMARK OFFICE
CERTIFICATE OF CORRECTION

PATENT NO. : 7,425,265 B2
APPLICATION NO. : 10/516232
DATED : September 16, 2008
INVENTOR(S) : Donald W. Schoendorfer It is certified that error appears in the above-identified patent and that said Letters Patent is hereby corrected as shown below:

In Column 11 (Table 1), under the heading "Sak content Input ppm," Line 49 (approx.) under the heading rows of Table 1, change -- 100000 -- to -- 10000 --.

In Column 11 (Table 1), under the heading "RPM," Line 49 (approx.) under the heading rows of Table 1, change -- 4000 -- to -- 4600 --.

In Column 11 (Table 1), under the heading "Drip rate," Line 54 (approx.) under the heading rows of Table 1, change -- 15 -- to -- 16 --.

[Note: A copy of Table 1, as correctly published in U.S. Publication No. 2006-0054549 A1 on March 16, 2006, is attached hereto in two (2) pages for purposes of further clarification.]

In Column 13, Line 1, change -- contaminatin -- to -- contaminating --.

Signed and Sealed this

Twenty-sixth Day of May, 2009

JOHN DOLL
*Acting Director of the United States Patent and Trademark Office*